UNITED STATES PATENT OFFICE.

ROBERT HOPFELT, OF COLOGNE-KLETTENBERG, GERMANY.

PROCESS FOR REMOVING OXYGEN FROM VESSELS.

975,040.   Specification of Letters Patent.   Patented Nov. 8, 1910.

No Drawing.   Application filed July 14, 1910.   Serial No. 572,010.

*To all whom it may concern:*

Be it known that I, ROBERT HOPFELT, a subject of the King of Prussia, German Emperor, residing at Cologne-Klettenberg, in the Province of the Rhine, Kingdom of Prussia, German Empire, have invented a certain new and useful Process for Removing Oxygen from Vessels, of which the following is a specification.

In evacuating incandescent lamp bulbs or any other containers whatever it is particularly important to remove the oxygen and generally it is not very harmful if other gases are left behind. As a rule a mere rinsing of the container with for example hydrogen is not by any means sufficient since oxygen adheres to all solid bodies so as to be only with difficulty detached therefrom and the hydrogen itself contains quite a considerable amount of oxygen. Complete evacuation of the lamps has been effected by means of phosphorous gases according to Malignani and good results have been obtained for carbon filament lamps. Larger containers, as for example, vessels for the preparation or formation of incandescent filaments and all containers which are to be heated, cannot be evacuated by phosphorus since in the first place the phosphorus in Malignani's process does not act by combustion but almost solely by the porosity of the resulting amorphous phosphorus by virtue of which it mechanically condenses all gases, nitrogen, hydrogen, water vapor, etc., as well as oxygen. It is further impossible without very great difficulty to introduce the phosphorous gases into the container in sufficient quantity since these gases are not easily led through long tubes and through cocks. Besides the phosphorous gases cannot be sufficiently mixed with other gases. For example it is known that pure nitrogen cannot be produced by the combustion of phosphorus in air.

The process hereinafter described which permits of the removal of oxygen in all cases even to infinitesimal traces in the simplest way, rests merely on the combustion of phosphorus to form oxygen phosphorus compounds.

If phosphorous halogen gases, for example phosphorus trichlorid are introduced together with hydrogen into a previously exhausted container by simply opening a cock, and if this gas mixture is then caused to explode or ignite by means of an electric spark or better by means of an incandescent wire or the like, the phosphorous halogens are split up by the hydrogen and the phosphorus in a nascent state combines with the oxygen present. In consequence of the good distribution of the gases the oxygen is diminished to a harmless amount even in comparatively large containers. In order to secure a good mixture it is best to introduce first the phosphorous halogens and then the hydrogen. After ignition this gas mixture can be used for any desired purpose or it may be again removed by a fresh exhaustion. In this case naturally small amounts of the gas mixture remain but these are practically free from oxygen. The process therefore is not itself a process of evacuation since the vacuum attained is simply and solely dependent upon the suction of the pumps. It is intended only to render the oxygen in the container or in the hydrogen innocuous but not to remove nitrogen etc. The hydrogen can then advantageously be used in the formation of metal filaments or for other purposes. The amount of the phosphorous halogen is determined by the amount of oxygen present. If there is much oxygen so that much of the phosphorous halogen is necessary a white deposit of oxygen phosphorus compounds is formed. Naturally such a deposit would be disadvantageous in incandescent lamps and the process can only be used for this purpose if the incandescent lamp bulb and the hydrogen to be used contain but little oxygen. Obviously incandescent lamps must be subsequently exhausted with particularly good pumps as otherwise the filament would be disintegrated by stray currents. The process and the hydrogen purified by the same can particularly be used in the process of forming incandescent filaments and in evacuating incandescent lamp bulbs.

What I claim is:

Process for the elimination of oxygen from any desired containers by union of the oxygen with phosphorus, consisting in causing phosphorous-halogen gases mixed with hydrogen to ignite in the previously evacuated container.

In testimony, whereof I have signed my name to this specification in the presence of two subscribing witnesses.

ROBERT HOPFELT.

Witnesses:
  LOUIS VANDORY,
  ROBERT H. DUNLAP.